United States Patent
Ando et al.

(10) Patent No.: US 6,461,769 B1
(45) Date of Patent: *Oct. 8, 2002

(54) ORGANIC ELECTROLYTIC CELL

(75) Inventors: Nobuo Ando, Osaka; Masaki Yamaguchi, Yao; Hajime Kinoshita, Osaka; Shizukuni Yata, Hyogo, all of (JP)

(73) Assignee: Kanebo Limited, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/355,164
(22) PCT Filed: Jan. 20, 1998
(86) PCT No.: PCT/JP98/00187
§ 371 (c)(1), (2), (4) Date: Dec. 21, 1999
(87) PCT Pub. No.: WO98/33227
PCT Pub. Date: Jul. 30, 1998

(30) Foreign Application Priority Data

Jan. 27, 1997 (JP) .............................. 9-028563
Jan. 28, 1997 (JP) .............................. 9-029743

(51) Int. Cl.[7] .......................... H01M 4/58; H01M 4/60; H01M 4/74; H01M 4/00
(52) U.S. Cl. .................. 429/231.95; 429/128; 429/212; 429/241
(58) Field of Search ........................... 429/212, 231.95, 429/233, 241, 128

(56) References Cited

U.S. PATENT DOCUMENTS

| 4,615,959 A |   | 10/1986 | Hayashi et al. |
|---|---|---|---|
| 4,658,498 A | * | 4/1987 | Yamaura et al. ............ 29/623.1 |
| 5,489,492 A | * | 2/1996 | Asami et al. ................ 429/212 |
| 5,981,107 A | * | 11/1999 | Hamano et al. ........ 429/231.95 |
| 6,001,139 A | * | 12/1999 | Asanuma et al. ........... 29/623.3 |

FOREIGN PATENT DOCUMENTS

| JP | 60-235372 | 11/1985 |
|---|---|---|
| JP | 8-162159 | 6/1996 |
| JP | 8-162160 | 6/1996 |
| JP | 8-162161 | 6/1996 |
| JP | 8-255633 | 10/1996 |

* cited by examiner

*Primary Examiner*—Stephen Kalafut
*Assistant Examiner*—Julian A. Mercado
(74) *Attorney, Agent, or Firm*—Morgan & Finnegan, L.L.P.

(57) ABSTRACT

Disclosed is an organic electrolytic cell comprising a positive electrode, a negative electrode and a solution of lithium salt in an aprotic organic solvent as an electrolytic solution. A current collector of positive electrode and a current collector of negative are respectively provided with pores piercing from the front surface to the back surface, an active material of negative electrode is capable of reversibly carrying lithium, and lithium originating in the negative electrode is carried by electrochemical contact with lithium arranged to face the negative or positive electrode. An opposed area of said lithium is not more than 40% of an area of the negative electrode.

5 Claims, 9 Drawing Sheets

ORGANIC ELECTROLYTIC CELL

TECHNICAL FIELD

The present invention relates to an organic electrolytic cell, which has a high capacity and high voltage and is superior in charge and discharge characteristics and safety.

BACKGROUND ART

In recent years, a secondary cell wherein an electrically conductive polymer, an oxide of a transition metal or the like is used as the positive electrode, and metallic lithium or a lithium alloy is used as the negative electrode has been proposed as a cell to be used in place of Ni—Cd storage cells and lead storage cells, because of its high energy density.

However, when such a secondary cell is subjected to repeated charge and discharge, its capacity is largely lowered due to deterioration of the positive or negative electrode, and thus there still remains a problem in its practical aspect. Particularly by deterioration of the negative electrode, mossy lithium, called dendrites, are formed, and through repeated charge and discharge, the dendrites finally pierce the separator and cause a short circuit. In some case, the cell is broken and thus there has been a problem in safety, too.

To solve the above problems, there has been proposed a cell wherein a carbon material such as graphite is used as the negative electrode and a lithium-containing metallic oxide such as $LiCoO_2$ is used as the positive electrode. This cell is a so-called rocking chair-type cell wherein, after assembly of the cell, lithium is supplied from the lithium-containing metallic oxide as the positive electrode to the negative electrode through charge, and lithium of the negative electrode is returned to the positive electrode through discharge. Although the cell is characterized by a high voltage and high capacity, the high energy density as an advantage of the lithium cells has not been obtained.

In the above rocking chair-type cell, it is an essential feature to use the lithium-containing metallic oxide as the positive electrode. Therefore, when using metallic oxides (e.g. $V_2O_5$, $MnO_2$, $TiS_2$, etc.), metallic sulfides, electrically conductive polymers (e.g. polyacene organic semiconductor, etc.) or the like proposed as the positive electrode material for lithium secondary cells, it is necessary to previously carry lithium on the positive or negative electrode. To obtain these positive electrode materials, there is required a method of carrying lithium, practically and simply.

In recent years, with the rapid progress of a study about a negative electrode material capable of reversibly carrying lithium, a material capable of carrying lithium in the amount exceeding that of $C_6Li$, which is a theoretic amount of the carbon material, and an oxide such as $SnO_2$ and $SiO_2$ have been proposed as the negative electrode material for high-capacity lithium secondary cells. Among them, an infusible and insoluble substrate having a polyacene skeletal structure and a hydrogen/carbon atomic ratio of 0.50 to 0.05, the substrate being a heat-treated product of an aromatic condensation polymer, is capable of doping with lithium up to $C_2Li$ (Synthetic Metals, 73 (1995) P273). However, the above locking chair-type cell wherein this infusible and insoluble substrate is used as the negative electrode and the lithium-containing metallic oxide as the positive electrode can attain a capacity higher than that in the case of the carbon material after assembly, but there still remains an unsatisfactory respect in its capacity.

To solve the above problems, PCT Publication No. WO95/8852, whose application was filed by the present applicant, has proposed an organic electrolytic cell comprising a positive electrode, a negative electrode and a solution of lithium salt in an aprotic organic solvent as an electrolytic solution, wherein the positive electrode contains a metallic oxide, the negative electrode is an infusible and insoluble substrate having a polyacene skeletal structure and a hydrogen/carbon atomic ratio of 0.50 to 0.05, the substrate being a heat-treated product of an aromatic condensation polymer, and the total amount of lithium contained in the cell is not less than 500 mAh/g and the amount of lithium originating in the negative electrode is not less than 100 mAh/g, based on the infusible and insoluble substrate as the negative electrode. Although this cell can attain a high capacity, a method of carrying lithium originating in the negative electrode, practically and simply, is required in the case of assembly of a practical cell such as cylindrical-type cell. Various specific methods thereof are proposed in Japanese Patent Kokai (Laid-Open) Publication Nos. 162159/1996, 162160/1996, 162161/1996 and 255633/1996. However, any of these methods has a problem in uniformity and operating property and the problem has still to be completely solved at present. That is, a most simple method in these specific methods includes a method of attaching a lithium metal on a positive or negative electrode, inserting the resultant into a cell container, together with the positive or negative electrode and a separator, pouring an electrolytic solution and allowing to stand, thereby to carry lithium on the positive or negative electrode. However, this method had such a problem that, since a lower limit of the thickness of a lithium metal foil to be attached, which can be mass-produced, is about 30 μm, the thickness of the positive and/or negative electrodes increases thereby to restrict design of the cell and to exert an influence particularly on charge and discharge characteristics.

The present inventors have studied intensively in light of the problems described above, thus completing the present invention. An object of the present invention is to provide an organic electrolytic cell, which is easy to produce, and which has a high capacity and high voltage and is superior in charge and discharge characteristics and safety.

Still another objects, features and advantages of the present invention will become apparent from the following description.

DISCLOSURE OF THE INVENTION

To attain these objects, the organic electrolytic cell of the present invention has the following construction. That is, the present invention provides an organic electrolytic cell comprising a positive electrode, a negative electrode and a solution of lithium salt in an aprotic organic solvent as an electrolytic solution, wherein a current collector of the positive electrode and a current collector of the negative electrode are respectively provided with pores piercing from the front surface to the back surface, an active material of negative electrode is capable of reversibly carrying lithium, and lithium originating in the negative electrode is carried by electrochemical contact with lithium arranged to face the negative or positive electrode and an opposed area of said lithium is not more than 40% of an area of the negative electrode.

The present invention also provides an organic electrolytic cell comprising a positive electrode, a negative electrode and a solution of lithium salt in an aprotic organic solvent as an electrolytic solution, wherein a current collector of the positive electrode and a current collector of the negative electrode are respectively provided with pores piercing from the front surface to the back surface, an active material of the positive electrode and an active material of the negative electrode are capable of reversibly carrying lithium, and at least one portion of lithium originating in the positive electrode is carried by electrochemical contact with lithium arranged to face the negative or positive electrode and an opposed area of said lithium is not more than 40% of an area of the positive electrode.

BRIEF DESCRIPTION OF THE INVENTION

BEST MODE FOR CARRYING OUT THE INVENTION

The active material of negative electrode in the organic electrolytic cell of the present invention may be any one capable of reversibly carrying lithium, and examples thereof include graphite, various carbon materials, polyacene substance, tin oxide, silicon oxide and the like. Among them, it is preferred to use an infusible and insoluble substrate having a polyacene skeletal structure and a hydrogen/carbon atomic ratio of 0.50 to 0.05, the substrate being a heat-treated product of an aromatic condensation polymer, because a high capacity can be obtained.

The aromatic condensation polymer is a condensate of an aromatic hydrocarbon compound and aldehydes. As the aromatic hydrocarbon compound, for example, so-called phenols such as phenol, cresol, xylenol and the like can be suitably used. There can also be used methylenebisphenols represented by the following formula:

wherein x and y are independently 0, 1 or 2, or hydroxybiphenyls or hydroxynaphthalenes. For practical purpose, phenols, particularly phenol, are preferred.

As the aromatic condensation polymer, there can also be used a modified aromatic condensation polymer wherein a portion of the aromatic hydrocarbon compound having phenolic hydroxyl groups is replaced with an aromatic hydrocarbon compound having no phenolic hydroxyl group such as xylene, toluene or aniline, for example, a condensate of phenol, xylene and formaldehyde. Furthermore, there can also be used a modified aromatic polymer wherein the above portion is replaced with melamine or urea. A furan resin is also preferred.

As the aldehyde, it is possible to use aldehydes such as formaldehyde, acetaldehyde and furfural, but formaldehyde is preferred. A phenolformaldehyde condensate may be any of a novolak type, a resol type or a mixture thereof.

The infusible and insoluble substrate can be obtained by a heat treatment of the above aromatic polymer, and includes all of infusible and insoluble substrates having a polyacene skeletal structure described in Japanese Patent Publication Nos. 44212/1989 and 24024/1991.

The infusible and insoluble substrate used in the present invention can also be produced as follows. That is, an infusible and insoluble substrate having a hydrogen/carbon atomic ratio (hereinafter referred to as H/C) of 0.50 to 0.05, preferably 0.35 to 0.10 can be obtained by gradually heating the aromatic condensation polymer up to a proper temperature of 400 to 800° C. in a non-oxidizing atmosphere (including a vacuum).

It is also possible to obtain an infusible and insoluble substrate having a specific surface area, measured by the BET method, of not less than 600 $m^2/g$ according to the method described in Japanese Patent Publication No. 24024/1991. For example, an infusible and insoluble substrate having the above H/C and having a specific surface area, measured by the BET method, of not less than 600 $m^2/g$ can also be obtained by preparing a solution containing a initial condensate of an aromatic condensation polymer and an inorganic salt such as zinc chloride; heating the solution to cure it in a mold; gradually heating the cured matter in a non-oxidizing atmosphere (including a vacuum) up to a temperature of 350 to 800° C., preferably up to a proper temperature of 400 to 750° C.; and then sufficiently washing it with water, diluted hydrochloric acid or the like.

With respect to the infusible and insoluble substrate used in the present invention, according to X-ray diffraction (CuK α), the main peak is observed at $2\theta=24°$ or less, and besides another peak is observed at between $2\theta=41°$ and $2\theta=46°$, in addition to the main peak. Namely, it is suggested that the infusible and insoluble substrate has a polyacene skeletal structure wherein an aromatic polycyclic structure is moderately developed, and takes an amorphous structure. Thus the substrate can be doped stably with lithium and, therefore, it is useful as an active material for cells.

It is preferred that this infusible and insoluble substrate has H/C ranging from 0.50 to 0.05. When H/C exceeds 0.50, the aromatic polycyclic structure does not sufficiently develop, and thus it is impossible to conduct doping and undoping of lithium smoothly, and when a cell is assembled, charge and discharge efficiency is lowered. On the other hand, when H/C is less than 0.05, the capacity of the cell of the present invention is likely to be lowered.

The negative electrode in the organic electrolytic cell according to the present invention is composed of the above infusible and insoluble substrate (hereinafter referred to as PAS), and practically, it is preferred to use a form obtained by forming PAS in an easily formable form such as a powdery form, a granular form or a short fiber form with a binder. As the binder, there can be used fluorine-containing resins such as polyethylene tetrafluoride and polyvinylidene fluoride, and thermoplastic resins such as polypropylene and polyethylene. It is preferred to use a fluorine binder. Use of a fluorine binder having a fluorine/carbon atomic ratio (hereinafter referred to as F/C) of less than 1.5 and not less than 0.75 is preferred, and use of a fluorine binder having a fluorine/carbon atomic ratio of less than 1.3 and not less than 0.75 is more preferred.

The fluorine binder includes, for example, polyvinylidene fluoride, vinylidene fluoride-ethylene trifluoride copolymer, ethylene-ethylene tetrafluoride copolymer, propylene-ethylene tetrafluoride or the like. Furthermore, it is also possible to use a fluorine-containing polymer wherein hydrogens at the principal chain are replaced with alkyl groups. In the case of the polyvinylidene fluoride, F/C is 1. In the case of the vinylidene fluoride-ethylene trifluoride copolymer, when the molar fractions of vinylidene fluoride are 50% and 80%, F/C values become 1.25 and 1.10, respectively. In the case of the propylene-ethylene tetrafluoride copolymer, when the molar fraction of propylene is 50%, F/C becomes 0.75. Among them, polyvinylidene fluoride, and a vinylidene fluoride-ethylene trifluoride copolymer wherein the molar fraction of vinylidene fluoride is not less than 50% are preferred. For practical purpose, polyvinylidene fluoride is preferred.

When using these binders, it is possible to sufficiently utilize the doping ability (capacity) with lithium which PAS has.

When using PAS, oxide or the like as the active material of negative electrode, if necessary, electrically conductive materials such as acetylene black, graphite, metallic powder and the like may be appropriately added in the negative electrode of the organic electrolytic cell of the present invention.

The active material of positive electrode in the organic electrolytic cell according to claim 1 of the present invention is not specifically limited, for example there can be used lithium-containing metallic oxides capable of electrochemically doping with lithium and electrochemically undoping lithium, which can be represented by the general formula $Li_xM_yO_z$ (M is a metal, or can be two or more metals) such as $Li_xCoO_2$, $Li_xNiO_2$, $Li_xMnO_2$ or $Li_xFeO_2$, or oxides of transition metals such as cobalt, manganese and nickel. The above electrically conductive polymers such as PAS can also be suitably used. Particularly, when a high voltage and high capacity are required, a lithium-containing oxide having a voltage of not less than 4 V vs lithium metal is preferred. Among them, lithium-containing cobalt oxides, lithium-containing nickel oxides or lithium-containing cobalt-nickel double oxides are particularly preferred.

The active material of positive electrode in the organic electrolytic cell according to claim 4 of the present invention is not specifically limited, for example there can be used lithium-containing metallic oxides capable of reversibly carrying lithium, which can be represented by the general formula $Li_xM_yO_z$ (M is a metal, or can be two or more metals) such as $Li_xCoO_2$, $Li_xNiO_2$, $Li_xMnO_2$ or $Li_xFeO_2$, or oxides and sulfides of transition metals such as cobalt, manganese, vanadium, titanium and nickel. The above electrically conductive polymers such as PAS can be suitably used. These active materials of positive electrode can be roughly classified into two kinds. That is, they are an active material of positive electrode (referred to as a first type of an active material of positive electrode in the present invention) capable of emitting lithium through electrochemical oxidation, namely charge, such as lithium-containing cobalt oxides, lithium-containing nickel oxides and lithium-containing cobalt-nickel double oxides, and the other active material of positive electrode (referred to as a second type of an active material of positive electrode in the present invention). Particularly, when a high voltage is required, a lithium-containing oxide having a voltage of not less than 4 V vs lithium metal is preferred. Among them, lithium-containing cobalt oxides, lithium-containing nickel oxides or lithium-containing cobalt-nickel double oxides are particularly preferred.

The positive electrode in the organic electrolytic cell of the present invention is one made by optionally adding an electrically conductive material and a binder to the above each active material and molding the mixture, and the kind and composition of the electrically conductive material and binder can be appropriately specified.

As the electrically conductive material, a powder of a metal such as metallic nickel can be used. Carbon material such as active carbon, carbon black, acetylene black and graphite can be suitably used. A mixing ratio of these electrically conductive materials varies depending on the electric conductivity of the active material, shape of the electrode, etc., but it is suitable to add it in an amount of 2 to 40% based on the active material.

The binder may be any one which is insoluble in an electrolytic solution described hereinafter used in the organic electrolytic solution of the present invention. There can be preferably used, for example, rubber binders such as SBR, fluorine-containing resins such as polyethylene tetrafluoride and polyvinylidene fluoride, and thermoplastic resins such as polypropylene and polyethylene. The mixing ratio is preferably not more than 20% based on the above active material.

As the solvent constituting the electrolytic solution used in the organic electrolytic solution of the present invention, an aprotic organic solvent is used. The aprotic organic solvent includes, for example, ethylene carbonate, propylene carbonate, dimethyl carbonate, diethyl carbonate, γ-butyrolactone, acetonitrile, dimethoxyethane, tetrahydrofuran, dioxolane, methylene chloride, sulfolane or the like. Furthermore, a mixed solution of two or more of these aprotic organic solvents can also be used.

Furthermore, as an electrolyte to be dissolved in the single or mixed solvent, any of electrolyte capable of forming lithium ions can be used. The electrolyte includes, for example, LiI, $LiClO_4$, $LiAsF_6$, $LiBF_4$, $LiPF_6$ or the like.

The electrolyte and solvent are mixed in a state of being sufficiently dehydrated to give an electrolytic solution. To make the internal resistance by the electrolytic solution small, it is preferred to make the concentration of the electrolyte in the electrolytic solution at least 0.1 mol/l and it is more preferred to make it 0.2 to 1.5 mol/l.

The current collector of positive electrode and current collector of negative electrode in the organic electrolytic cell of the present invention are respectively provided with pores piercing from the front surface to the back surface, and are made of materials such as expanded metal, punched metal, net, foamed material or the like. The form and number of these through pores are not specifically limited and can be appropriately determined so that lithium ions in the electrolytic solution described hereinafter can transfer between the surface and back surfaces of the electrode without being interrupted by the current collector of electrode. For example, when the proportion (form and number) of the through pores is determined by the porosity of the electrode-current collector, it is preferred to make the porosity 10% or more, particularly 30% or more. The porosity of the electrode current collector is obtained by reducing a ratio of {1−(weight of current collector/true specific gravity of current collector)/(apparent volume of current collector)} to percentage. When this porosity is small, the time of carrying lithium originating in the negative or positive electrode becomes long. On the other hand, when it is too large, the resulting cell has a high internal resistance and, therefore, the porosity is preferably determined by considering the desired cell characteristics, thickness of the electrode, safety, and kind of the current collector. As the material of the electrode-current collector, there can be used various materials which are generally proposed in lithium cells. Aluminum and stainless steel can be used as the current collector of positive electrode, whereas, stainless steel, copper and nickel can be used as the current collector of negative electrode. With respect to the current collector of positive electrode of the organic electrolytic cell according to claim 4, when lithium is directly attached as described hereinafter, it is preferred to use a material, which does not make an alloy with lithium and has resistance to electrochemical oxidation, such as stainless steel.

In the organic electrolytic cell according to claim 1 of the present invention, lithium originating in the negative electrode is carried by electrochemical contact with lithium arranged to face the negative or positive electrode and the opposed area of said lithium is not more than 40%, preferably not more than 30% of the area of the negative electrode. In the organic electrolytic cell according to claim 4 of the present invention, lithium originating in the positive electrode is carried by electrochemical contact with lithium arranged to face the negative or positive electrode and the opposed area of said lithium is not more than 40%, preferably not more than 30% of the area of the positive electrode. The term "lithium" used in this specification refer to any material, which contains at least lithium and is capable of supplying lithium ions, such as lithium metal, lithium-aluminum alloy or the like.

In the case of a lithium foil or lithium plate, the opposed area of lithium is an area at the portion where the foil or plate and the negative or positive electrode are faced each other. That is, in the case of those having the form shown in FIG. 1, FIG. 2, FIG. 4 and FIG. 5 to be described hereinafter as the embodiment of the present invention, it is an area of one surface. In the case of those having the form shown in FIG. 3 and FIG. 6, it is the total of areas of both surfaces. In the case of lithium formed in a cylindrical or prismatic shape, it is an area of the side. Any of the area of negative electrode and area of positive electrode is an area at the portion where the negative electrode and positive electrode are faced each other.

When a lithium metallic foil is attached on both surfaces of a negative electrode plate molded on both surfaces of a copper foil, the opposed area of lithium becomes 100% of the area of negative electrode. When a lithium metallic foil is attached on one surface of a negative electrode plate molded into an expanded metal, the opposed area of lithium becomes 50% of the area of negative electrode.

When a lithium metallic foil is attached on both surfaces of a positive electrode plate molded on both surfaces of an aluminum foil, the opposed area of lithium becomes 100% of the area of positive electrode. When a lithium metallic foil is attached on one surface of a positive electrode plate molded into an expanded metal, the opposed area of lithium becomes 50% of the area of positive electrode.

In the organic electrolytic cell according to the present invention, by locally arranging lithium originating in the negative or positive electrode at a specific position, the opposed area of lithium is made 40% or less, preferably 30% or less of the area of negative electrode or area of positive electrode, thereby making it possible to improve the freedom of the cell design and mass-productivity and to afford excellent charge and discharge characteristics. That is, it is very complicated to attach a lithium metal on almost all of the negative or positive electrode, like the above example, and it is not suited for industrial production and it becomes difficult to conduct mass-production. When the opposed area of lithium exceeds 40% of the area of negative electrode or area of positive electrode, the thickness of the electrode is decided by that of lithium, thereby to cause a problem that desired charge and discharge characteristics can not be obtained.

In the organic electrolytic cell according to claim 1 of the present invention, the total amount of lithium contained the cell is preferably not less than 500 mAh/g and the amount of lithium originating in the negative electrode is preferably not less than 100 mAh/g, based on the active material of negative electrode. The total amount of lithium contained the cell is the total of the amount of lithium originating in the positive electrode, that of lithium originating in the electrolytic solution and that of lithium originating in the negative electrode. Lithium originating in the positive electrode is lithium contained in the positive electrode on assembly of the cell, and a portion or all of said lithium is supplied to the negative electrode through an operation of applying a current from an external circuit (charge).

In the organic electrolytic cell according to claim 4 of the present invention, lithium originating in the positive electrode is lithium contained in the positive electrode and at least one portion, namely a portion or all of lithium is carried by electrochemical contact with lithium arranged to face the negative or positive electrode. For example, when using $LiCoO_2$ as the active material of positive electrode, $LiCoO_2$ has already contained lithium on assembly of the cell, but lithium originating in the positive electrode is obtained by further adding lithium carried through electrochemical contact with lithium. On the other hand, when using $V_2O_5$ as the active material of positive electrode, since this material does not contain lithium, all of lithium originating in the positive electrode is carried by electrochemical contact with lithium. At least one portion, namely portion or all of this lithium originating in the positive electrode is supplied to the negative electrode through an operation of applying a current from an external circuit (charge). Then, the electrochemical contact between lithium and the positive electrode initiates when the electrolytic solution is poured into the cell system. When using the above first type of an active material of positive electrode, since said active material of positive electrode has already contained releasable lithium, it becomes possible to charge the cell system immediately after pouring the electrolytic solution into the cell system. Also when using the second type of an active material of positive electrode, it is possible to charge the cell system before all lithium is completely charged on the active material of positive electrode after pouring the electrolytic solution into the cell system. The above charge operation is effective to reduce the carrying time and to prevent the positive electrode from being in an over-discharge state, thereby preventing deterioration of the positive electrode due to the carrying operation of lithium.

Lithium originating in the electrolytic solution in the organic electrolytic cell of the present invention is lithium in the electrolytic solution contained in the separator, positive electrode and negative electrode, whereas, lithium originating in the negative electrode is lithium carried on the active material of negative electrode and is lithium other than lithium originating in the positive electrode and lithium originating in electrolytic solution.

FIG. 1 to FIG. 6 respectively illustrate the embodiment of a cell of the type wherein plural pairs of positive electrode plates, a separator and a negative electrode plate are laminated in sequence in the organic electrolytic cell of the present invention.

Figure 1:
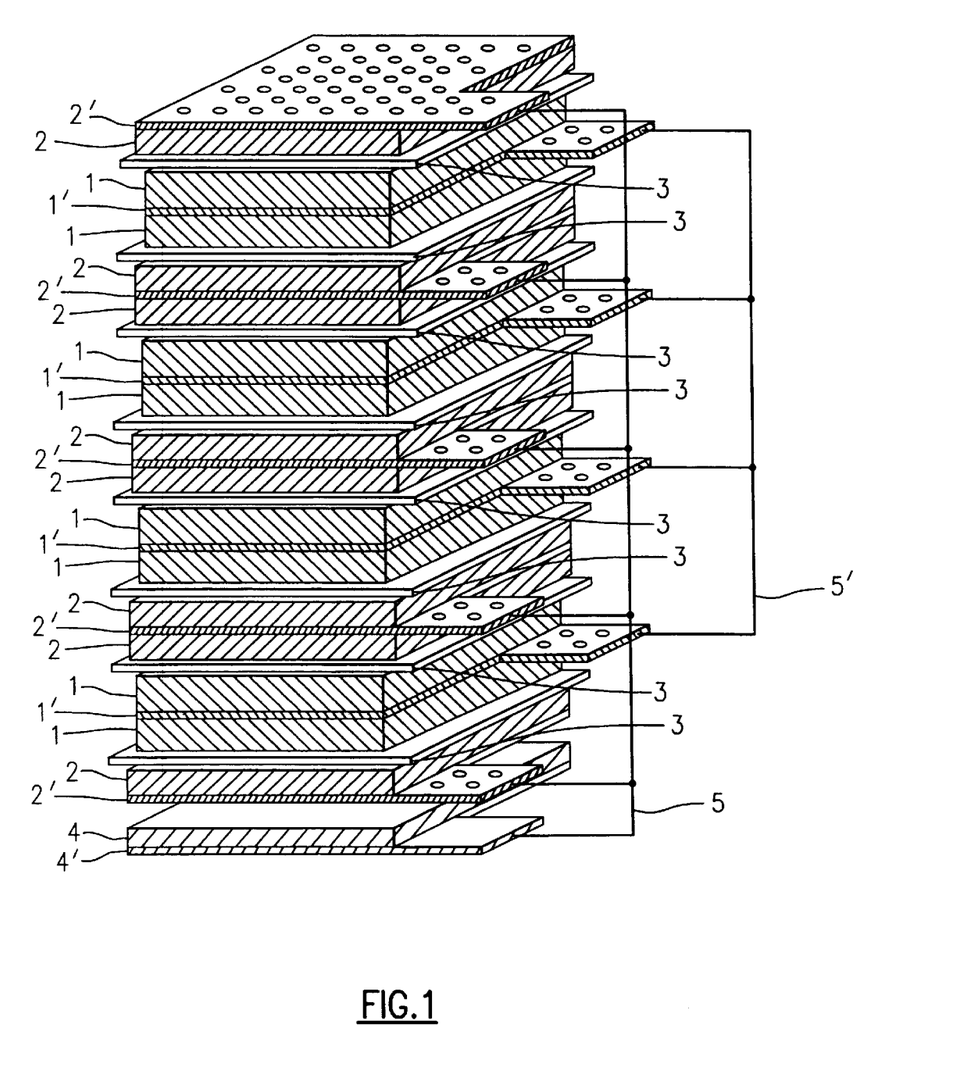
FIG. 1 is a view illustrating the arrangement of a first embodiment of electrodes in the cell according to the present invention.

FIG. 1 illustrates one embodiment of the arrangement of electrodes in a casing of the cell of the above type. In this embodiment, a negative electrode 2 molded on both surfaces of a current collector 2' of negative electrode and a lithium metal 4 contact-bonded on a lithium metal current collector 4' made of a stainless mesh or a copper expanded metal, which is arranged at the lower portion of a multi-layer unit, are connected through a conductor 5. A positive electrode 1 molded on both surfaces of a current collector 1' of positive electrode is laminated via the above negative electrode 2 and separator 3, and is connected through a conductor 5'. The above current collector 2' of negative electrode and lithium metal current collector 4' can also be welded directly.

Figure 2:
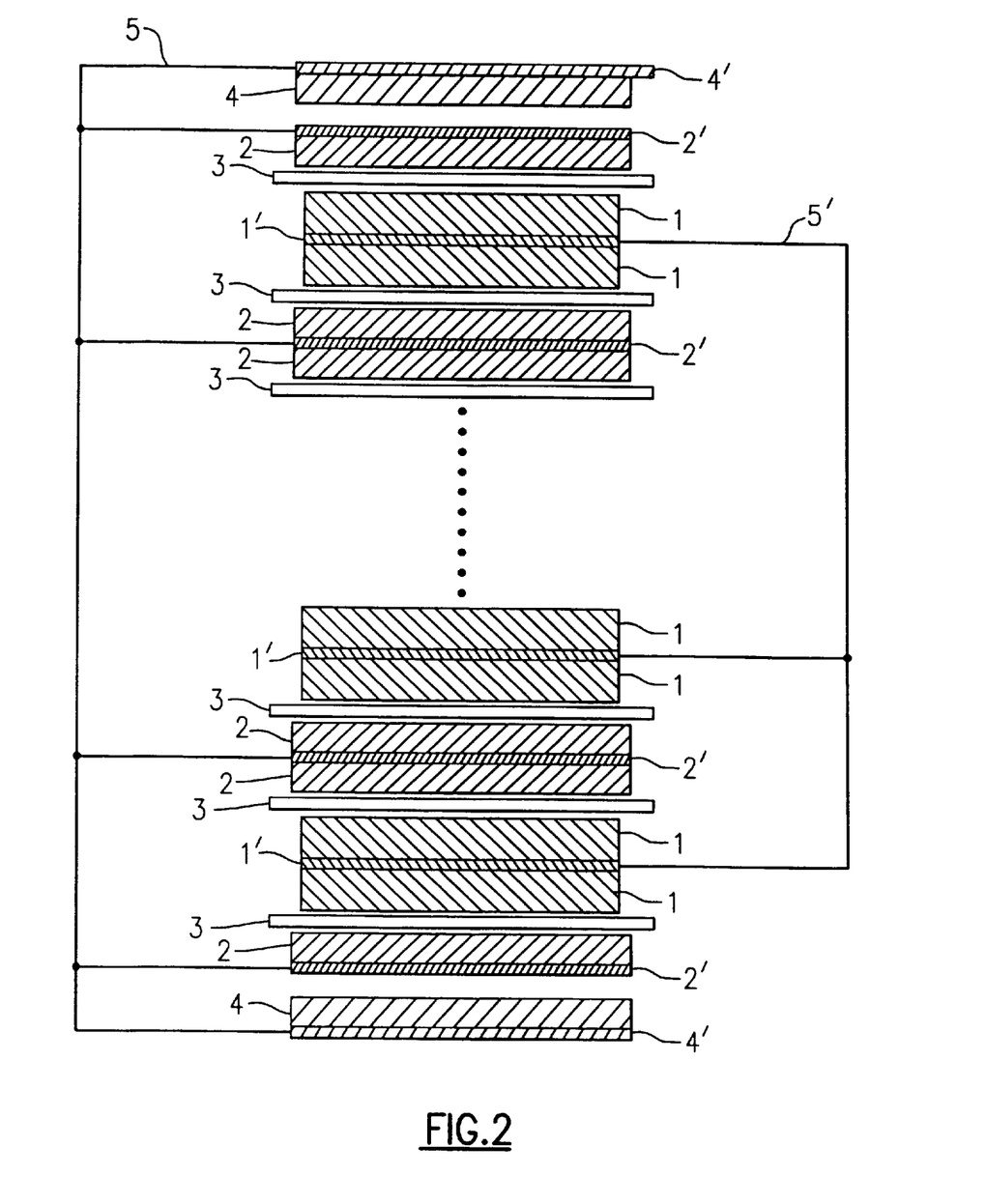
FIG. 2 is a view illustrating the arrangement of a second embodiment of electrodes in the cell according to the present invention.

FIG. 2 illustrates a modified embodiment of the arrangement of electrodes shown in FIG. 1. In this cell, the lithium metal 4 contact-bonded on the lithium metal current collector 4' is arranged at the upper and lower portions of the multi-layer unit, respectively.

Figure 3:
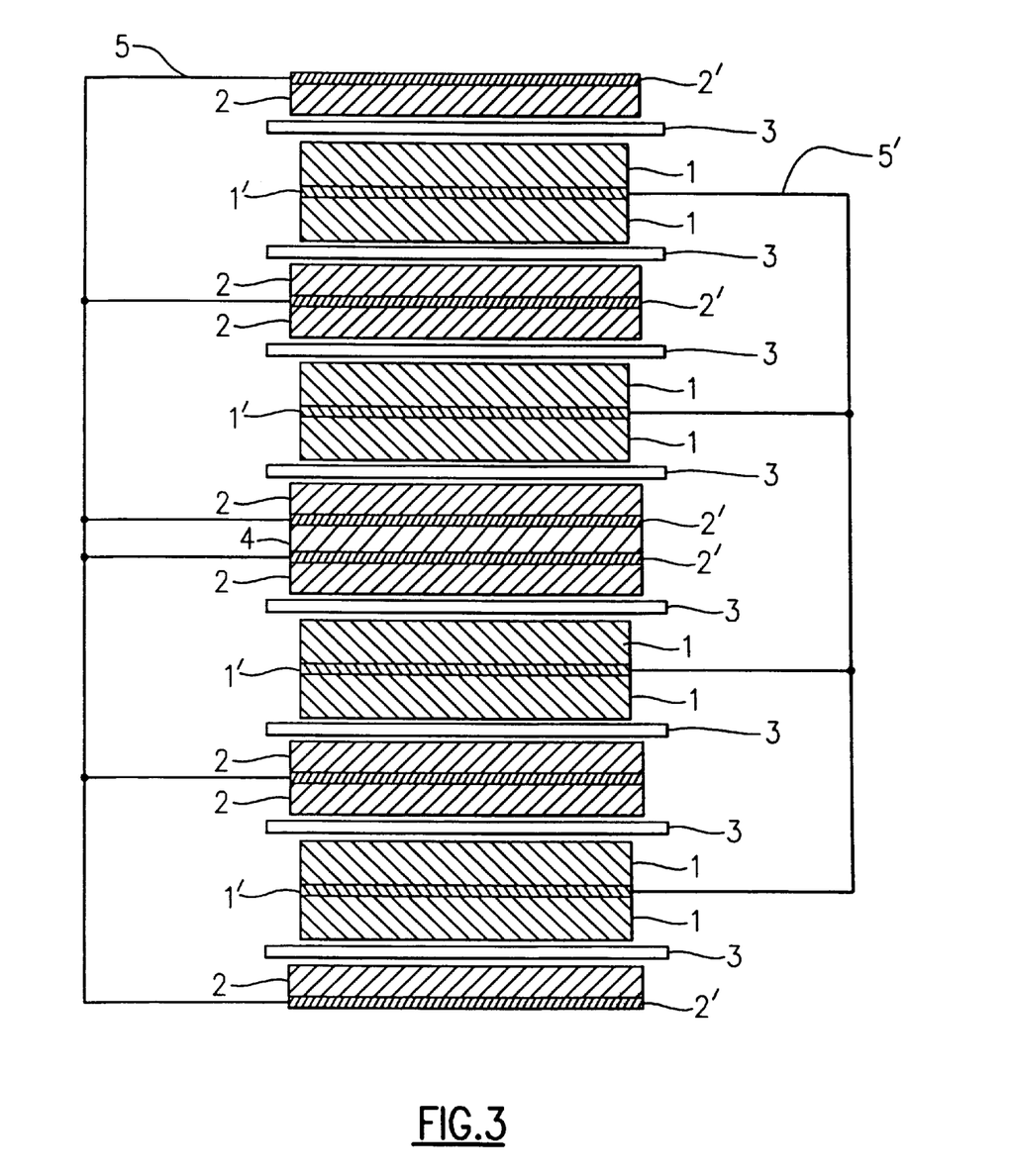
FIG. 3 is a view illustrating the arrangement of a third embodiment of electrodes in the cell according to the present invention.

Another modified embodiment shown in FIG. 3 illustrates that the lithium metal 4 is arranged in the center of the multi-layer unit.

Figure 4:
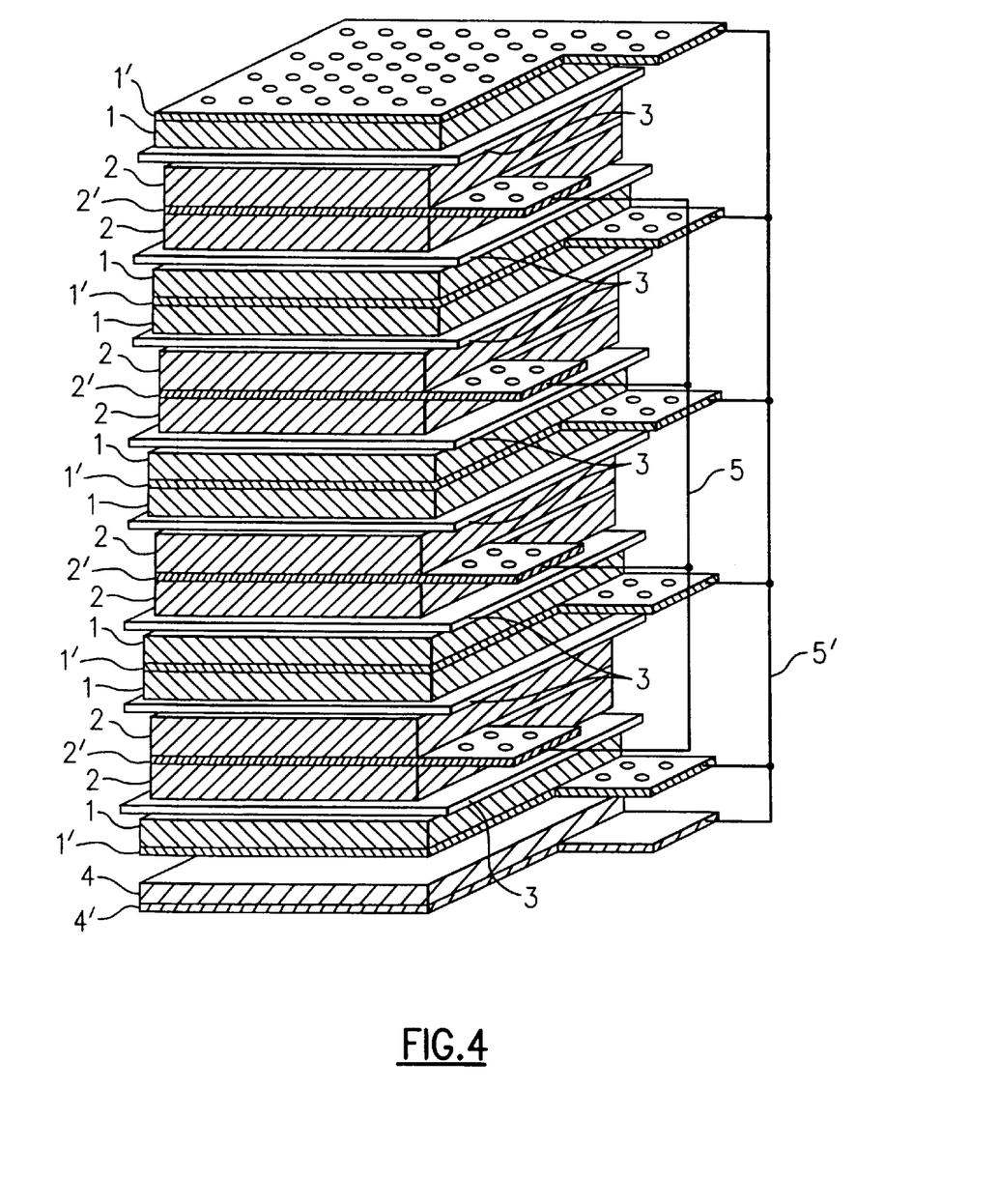
FIG. 4 is a view illustrating the arrangement of a fourth embodiment of electrodes in the cell according to the present invention.

FIG. 4 illustrates another embodiment of the arrangement of electrodes of the above type. In this embodiment, the positive electrode 1 molded on both surfaces of the current collector 1' of positive electrode and the lithium metal 4 contact-bonded on the lithium metal current collector 4' made of a stainless mesh or a copper expanded metal, which is arranged at the lower portion of the multi-layer unit, are connected through the conductor 5'. The negative electrode 2 molded on both surfaces of the current collector 2' of negative electrode is laminated via the above positive electrode 1 and separator 3, and is connected through the conductor 5. The above current collector 1' of positive electrode and lithium metal current collector 4' can also be welded directly.

Figure 5:
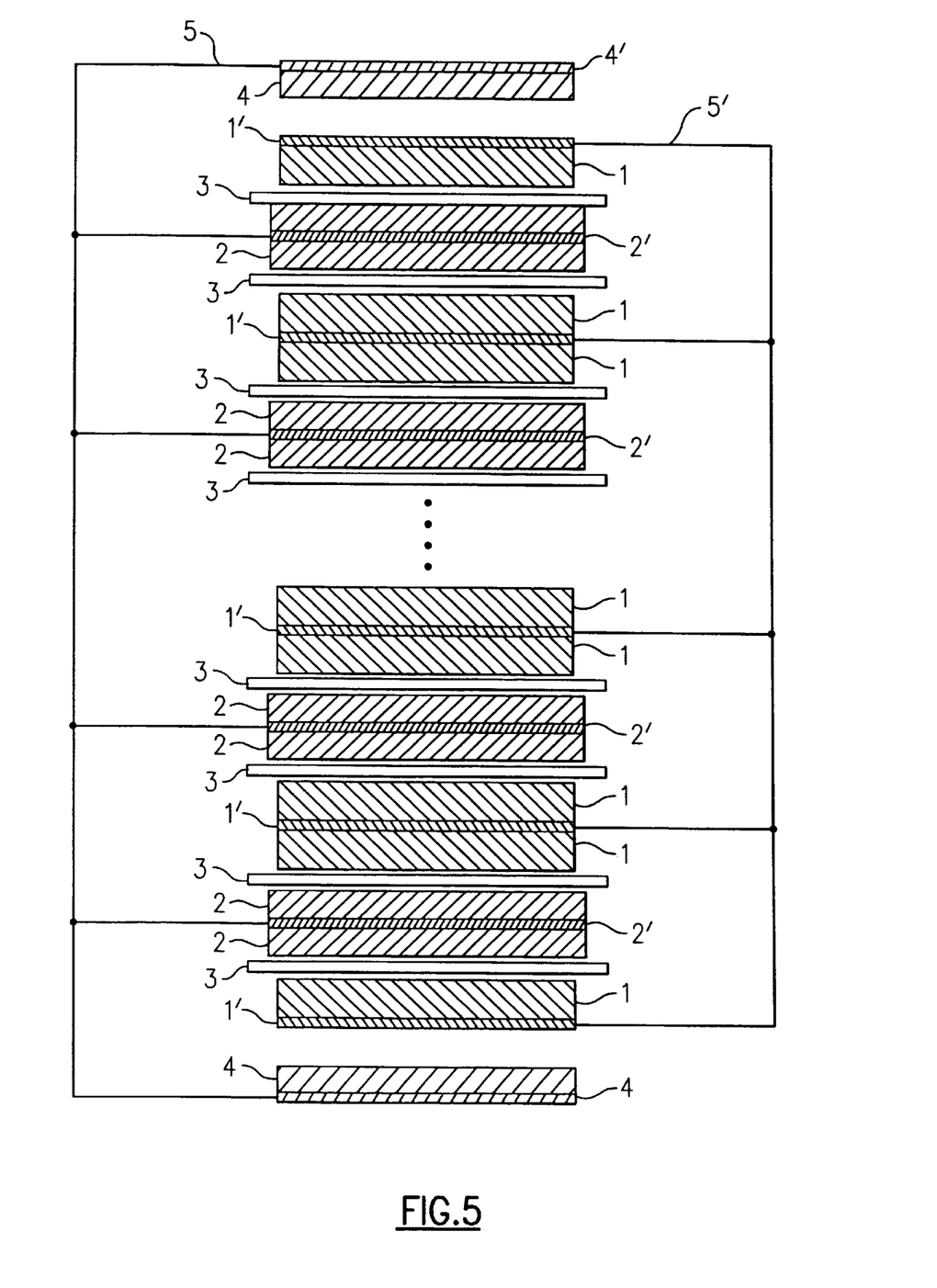
FIG. 5 is a view illustrating the arrangement of a fifth embodiment of electrodes in the cell according to the present invention.

FIG. 5 illustrates a modified embodiment of the arrangement of electrodes shown in FIG. 4. In this cell, the lithium metal 4 contact-bonded on the lithium metal current collector 4' is arranged at the upper and lower portions of the multi-layer unit, respectively.

Figure 6:
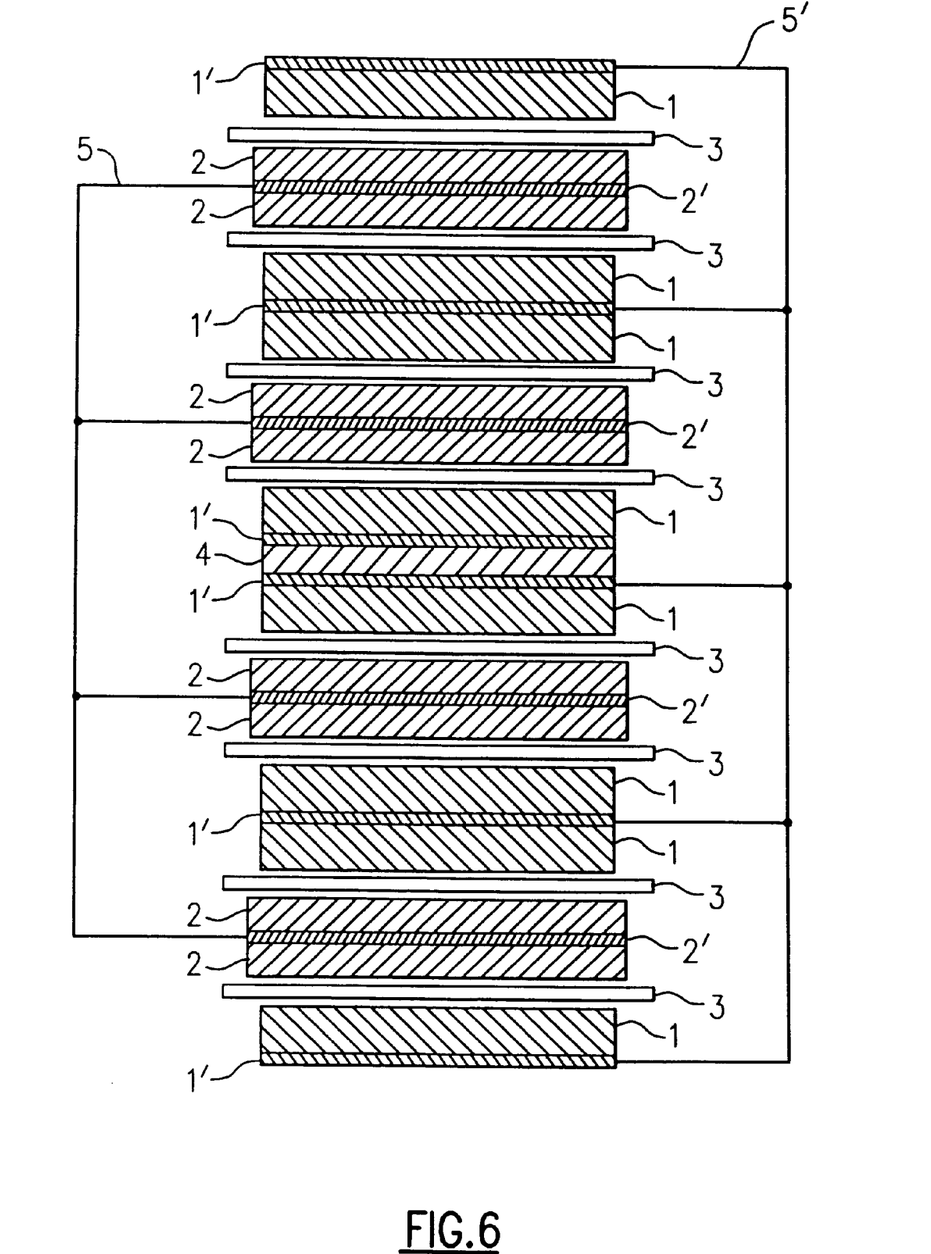
FIG. 6 is a view illustrating the arrangement of a sixth embodiment of electrodes in the cell according to the present invention.

Another modified embodiment shown in FIG. 6 illustrates that the lithium metal 4 is arranged in the center of the multi-layer unit.

In the above respective embodiments, the current corrector 1' of positive electrode and current corrector 2' of negative electrode are respectively provided with pores (shown on FIGS. 1 and 4) piercing from the front surface to the back surface, and a terminal of positive electrode and a terminal of negative electrode of the cell are connected with them, respectively.

In the embodiments shown in FIG. 1 to FIG. 3, the current collector 1' of positive electrode can be directly welded without providing the conductor 5'. In the embodiments shown in FIG. 4 to FIG. 6, the current collector 2' of negative electrode can be directly welded without providing the conductor 5.

As mentioned above, in the arrangement of the electrodes of a multi-layer type cell, the position of the lithium metal 4 to be arranged can be appropriately changed as shown in the above embodiments.

Figure 7:
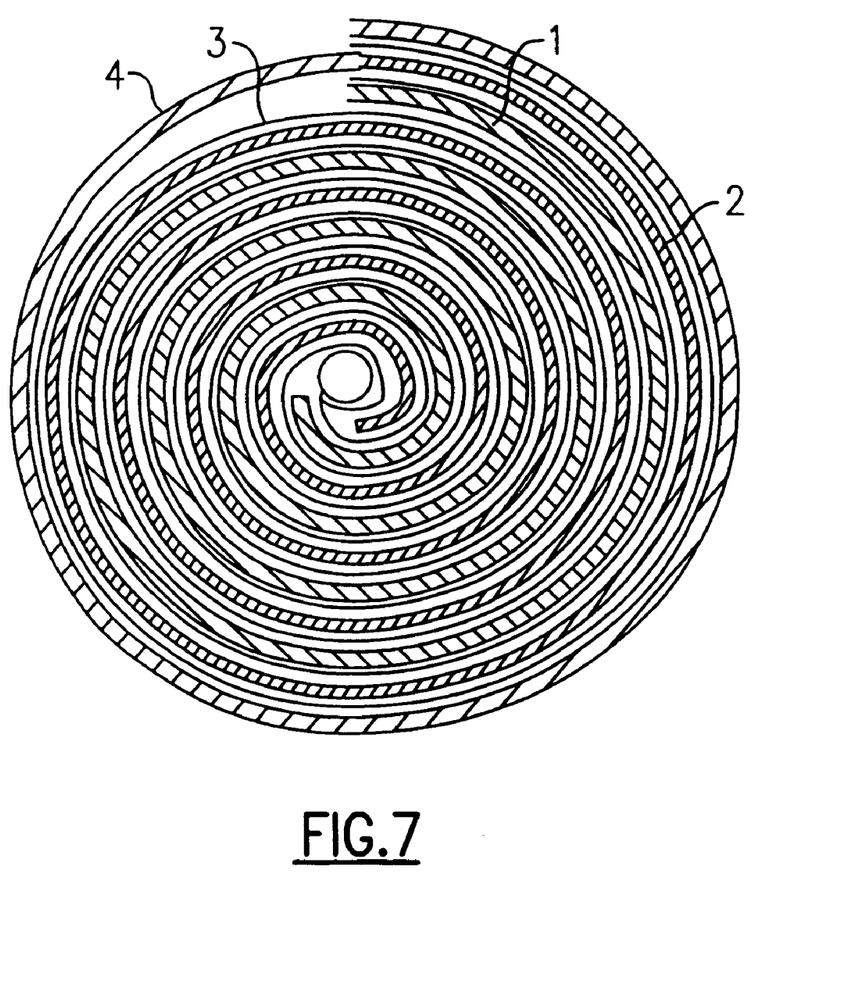
FIG. 7 is a view illustrating the arrangement of a seventh embodiment of electrodes in the cell according to the present invention.
Figure 8:
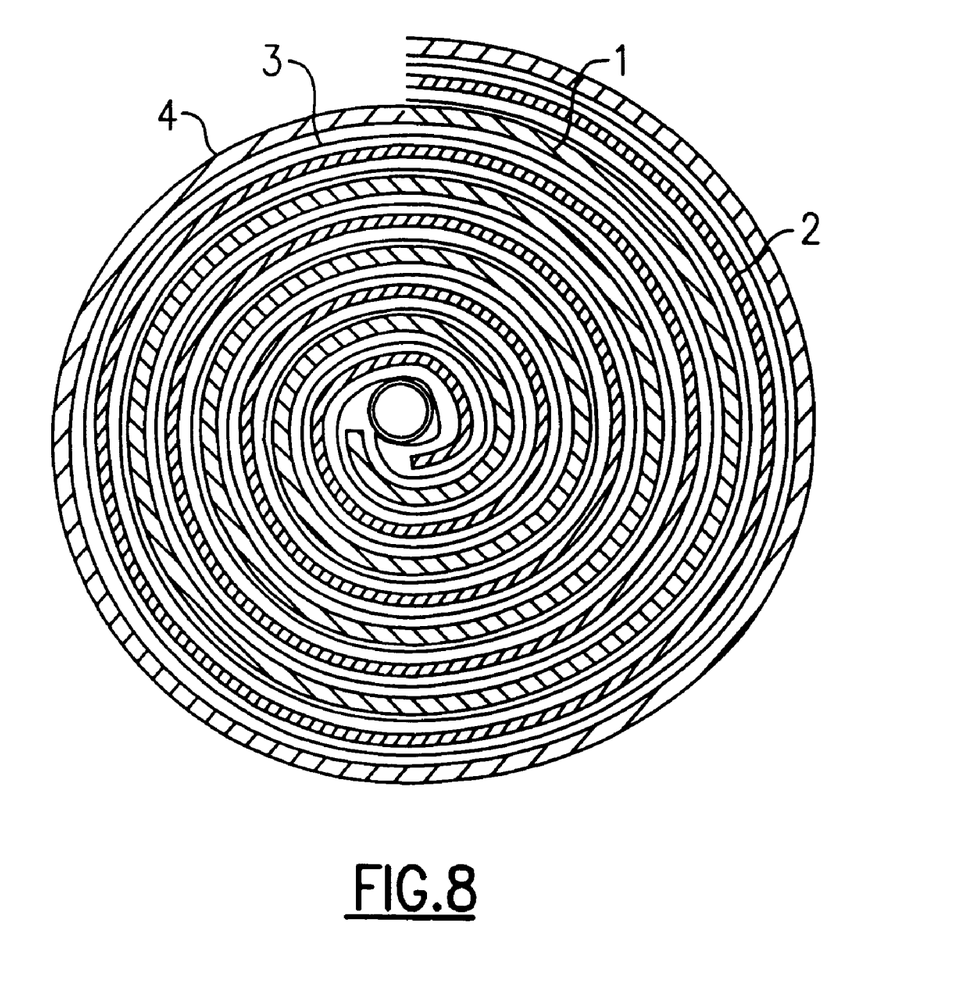
FIG. 8 is a view illustrating the arrangement of an eighth embodiment of electrodes in the cell according to the present invention.
Figure 9:
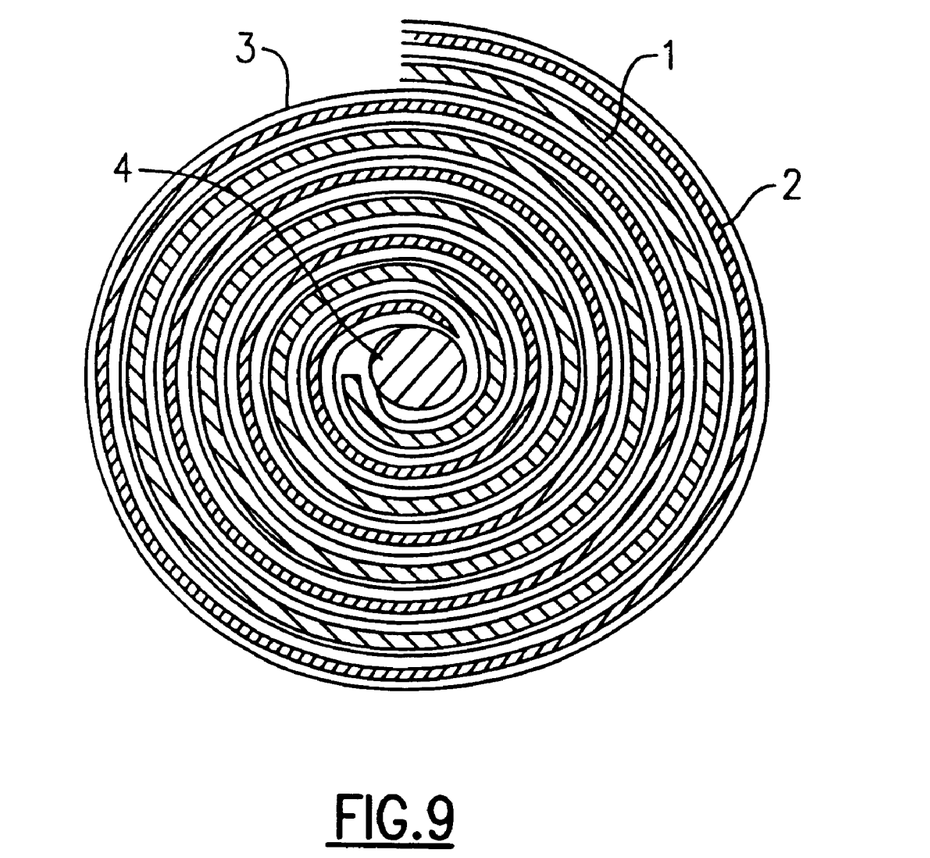
FIG. 9 is a view illustrating the arrangement of a ninth embodiment of electrodes in the cell according to the present invention.

FIG. 7 to FIG. 9 respectively illustrate the embodiment of the arrangement of electrodes of a cell having a wound-type structure used in a cylindrical cell as the embodiment of the present invention. In the arrangement of these cells, a positive electrode 1 and a negative electrode 2 are molded on a current collector, respectively (in the drawing, the current collector is eliminated). FIG. 7 illustrates the embodiment wherein the lithium metal 4 is attached on the current collector of an outer-most negative electrode 2 (in the drawing, only the lithium metal 4 is shown at the portion where the lithium metal is laminated), whereas, FIG. 8 illustrates the embodiment wherein the lithium metal 4 is attached on the current collector of an outer-most positive electrode 1 (in the drawing, only the lithium metal 4 is shown at the portion where the lithium metal is laminated). FIG. 9 illustrates the embodiment wherein the lithium metal 4 having a columnar shape is arranged in the center of a wound-type structure.

In the above arrangement of the electrodes, the separator 3 is made of a porous material, which is durable against the electrolytic solution or the electrode active material and which has open pores and is electrically non-conductive. There can be usually used a cloth, non-woven fabric or porous material made of glass fiber, polyethylene or polypropylene. To decrease the internal resistance of the cell, the separator 3 is preferably as thin as possible. Its thickness, however, is determined by appropriately considering the amount of electrolytic solution held, permeability, strength or the like. The separator 3 is impregnated with the electrolytic solution, and in the electrolytic solution, the above compound capable of forming lithium ions with which doping is made is dissolved in an aprotic organic solvent. The electrolytic solution is usually a liquid and impregnated into the separator 3, but it can also be used, without any separator 3, after being made into gel or a solid for preventing leakage of the solution.

In the above embodiments, the negative or positive electrode is made contact with lithium (lithium metal in these embodiments) via the conductor 5 or 5' made of nickel, copper or stainless steel, or attaching lithium on the current collector of negative electrode or the current collector of positive electrode, but the organic electrolytic cell of the present invention is not specifically limited to this structure. For example, lithium may also be made contact by directly attaching it on the negative or positive electrode, or by directly attaching it on a negative electrode case or a positive electrode case. That is, it is necessary to arrange so that, when the electrolytic solution is poured on assembly of the cell, any of the negative or positive electrode is electrochemically made contact with lithium thereby to carry lithium on an active material of negative electrode or an active material of positive electrode and the active material of negative electrode via the electrolytic solution.

Particularly, by filling the pore portion of an electrically conductive porous material such as stainless steel mesh as the lithium metal current collector with 80% or more of lithium metal, a space is hardly formed between electrodes by disappearance of lithium even if lithium is doped. Thus, lithium is smoothly carried on the active material of negative electrode or the active material of positive electrode.

To the contrary, there can also be employed a method of arranging lithium in a transverse direction of the negative electrode plate or positive electrode plate and carrying lithium on the active material of negative electrode or active material of positive electrode by electrochemical contact between the negative or positive electrode and lithium in the cell. However, according to this method, it is impossible to avoid a problem that unevenness in doping in the cell increases and lithium is partially deposited on the negative electrode, resulting in long carrying time. Accordingly, in the present invention, it is required to arrange so that the positive or negative electrode and lithium face each other.

In this cell, the amount of lithium originating in the negative electrode or lithium originating in the positive electrode can be appropriately determined by the desired cell, active material of negative electrode or active material of positive electrode, but a particularly high-capacity cell can be obtained by using PAS as the active material of negative electrode and satisfying the following conditions. That is, when using PAS as the active material of negative electrode, the total amount of lithium in the cell is preferably not less than 500 mAh/g, more preferably not less than 600 mAh/g, based on PAS of negative electrode so as to obtain a sufficient capacity.

In the organic electrolytic cell according to claim 1, the amount of lithium originating in the negative electrode is preferably not less than 100 mAh/g, more preferably not less than 150 mAh/g, based on PAS of negative electrode. When the amount of lithium originating in the negative electrode is less than 100 mAh/g even if the total amount of lithium is not less than 500 mAh/g based on PAS of negative electrode, there is some possibility of causing a problem that a sufficient capacity can not be obtained. When using a lithium-containing metal oxide as the positive electrode, a high capacity can be obtained by adjusting the amount of lithium originating in the negative electrode to 600 mAh/g or less based on PAS of negative electrode, which is preferred. Although the amount of lithium originating in the positive electrode and that of lithium originating in the electrolytic solution can be appropriately determined, the amount of lithium originating in the positive electrode is preferably not less than 300 mAh/g based on PAS of negative electrode so as to obtain a high capacity when using a lithium-containing metal oxide as the positive electrode.

In the organic electrolytic cell according to claim 4, when using the above first type of an active material of positive electrode, lithium originating in the positive electrode is preferably carried in the amount of not less than 100 mAh/g, more preferably not less than 150 mAh/g, based on PAS of negative electrode, in addition to lithium contained intrinsically in the positive electrode so as to obtain a high capability. In this organic electrolytic cell, lithium originating in the negative electrode may be previously carried on PAS as the active material of negative electrode. Particularly, when using the above second type of an active material of positive electrode, since the amount of lithium to be carried increases, it is effective to separately carry a required amount of lithium on the negative or positive electrode so as to reduce the carrying time.

The shape of the organic electrolytic cell according to the present invention includes, for example, cylindrical shape, rectangular shape and box shape, but is not specifically limited.

EXAMPLE 1

A phenol-formaldehyde resin having a thickness of 0.5 mm was put in a silicon carbide heating elements, and heat-treated by heating to 500° C. under a nitrogen atmosphere at a rate of 50° C./hour and then heating to 650° C. at a rate of 10° C./hour, thereby to synthesize PAS. The PAS plate thus obtained was ground by using a disc mill to obtain PAS powder having an average particle diameter of about 7 μm. The H/C ratio of this PAS powder was 0.22.

Then, 100 parts by weight of the PAS powder and 10 parts by weight of acetylene black were sufficiently mixed with a solution of 10 parts by weight of polyvinylidene fluoride powder in 120 parts by weight of N-methyl pyrrolidone to obtain a slurry. The slurry was molded on both surfaces of a copper expanded metal having a thickness of 60 μm (porosity: 70%) (manufactured by Sank Co., LW: 1 mm, SW: 0.5 mm) to obtain a PAS negative electrode having a thickness of 520 μm. In addition, 100 parts by weight of $LiCoO_2$ (first type of positive electrode) and 5 parts by weight of graphite were sufficiently mixed with a solution of 3.5 parts by weight of polyvinylidene fluoride powder in 50 parts by weight of N-methyl pyrrolidone to obtain a slurry. The slurry was molded on both surfaces of an aluminum expanded metal having a thickness of 240 μm (porosity: 88%) (manufactured by Sank Co., LW: 2 mm, SW: 1 mm) to obtain a positive electrode having a thickness of 780 μm.

Using the above positive electrode (2.0×3.0 $cm^2$), PAS negative electrode (2.2×3.2 $cm^2$) and a polypropylene separator having a thickness of 25 μm, two cells wherein the positive electrode, separator and negative electrode (four positive electrodes) are laminated shown in FIG. 1 were assembled. As two outer negative electrodes, one having a thickness of 290 μm obtained by peeling off one of the above negative electrodes molded on both surfaces was used. As the lithium metal, one obtained by contact-bonding a lithium metallic foil (240 μm, 2.2×3.2 $cm^2$) on a stainless steel net having a thickness of 80 μm was used and was arranged to face the negative electrode. The negative electrodes (one surface×2, both surfaces×3) were respectively made contact with the stainless steel net, on which lithium was contact-bonded, through welding. The opposed area (7.04 $cm^2$) of lithium was 12.5% of the area of the negative electrode (7.04 $cm^2$×8 (both surfaces×3, one surface×2)=56.32 $cm^2$). The amount of lithium metal was about 250 mAh/g based on the negative electrode PAS. As the electrolytic solution, a solution of $LiPF_6$ at a concentration of 1 mol/l in a 1:1 (volume ratio) mixed solution of ethylene carbonate and diethyl carbonate was used. The total amount of lithium contained in the cell was 1500 mAh/g based on the negative electrode PAS. One cell was allowed to stand at room temperature for two days, and then decomposed. As a result, lithium metal completely disappeared.

Each of the above cells was charged at 4.2V for 12 hours at the maximum current of 150 mA. Subsequently, each of the above cells was discharged at a constant current of 70 mA until the cell voltage became 2.0 V. This 4.2 V-2.0 V cycle was repeated, and in the third discharge, the cell capacity was evaluated. As a result, it was 720 mAh. In the fourth cycle, discharge at constant current of 350 mA was conducted and the cell capacity was evaluated. As a result, it was 300 mAh.

EXAMPLE 2

In the same manner as in Example 1, a PAS negative electrode having a thickness of 182 μm and a positive electrode having a thickness of 271 μm were obtained. Using the positive electrode (2.0×3.0 $cm^2$), PAS negative electrode (2.2×3.2 $cm^2$) and a polypropylene separator having a thickness of 25 μm, two cells wherein the positive electrode, separator and negative electrode (nine positive electrodes) are laminated shown in FIG. 1 were assembled. As two outer negative electrodes, one having a thickness of 130 μm obtained by peeling off one of the above negative electrodes molded on both surfaces was used. As the lithium metal, one obtained by contact-bonding a lithium metallic foil (289 μm, 2.2×3.2 $cm^2$) on a stainless steel net having a thickness of 80 μm was used and was arranged to face the negative electrode. The negative electrodes (one surface×2, both surfaces×8) were respectively made contact with the stainless steel net, on which lithium was contact-bonded, through welding. The opposed area (7.04 cm$^2$) of lithium was 5.6% of the area of the negative electrode (7.04 cm$^2$×18 (both surfaces×8, one surface×2)=126.72 cm$^2$). The amount of lithium metal was about 250 mAh/g based on the negative electrode PAS. The total thickness of the electrode, separator and lithium metal was almost the same as in Example 1. Also, the electrolytic solution was the same as in Example 1. The total amount of lithium contained in the cell was 1500 mAh/g based on the negative electrode PAS. One cell was allowed to stand at room temperature for two days, and then decomposed. As a result, lithium metal completely disappeared.

Each of the above cells was charged at 4.2V for 12 hours at the maximum current of 150 mA. Subsequently, each of the above cells was discharged at a constant current of 70 mA until the cell voltage became 2.0 V. This 4.2 V-2.0 V cycle was repeated, and in the third discharge, the cell capacity was evaluated. As a result, it was 650 mAh. In the fourth cycle, discharge at constant current of 350 mA was conducted and the cell capacity was evaluated. As a result, it was 620 mAh.

EXAMPLE 3

Using the same positive electrode, PAS negative electrode and separator as in Example 2, two cells wherein the positive electrode, separator and negative electrode (nine positive electrodes) are laminated shown in FIG. 1 were assembled. As two outer negative electrodes, one having a thickness of 130 μm obtained by peeling off one of the above negative electrodes molded on both surfaces was used. As the lithium metal, one obtained by contact-bonding a lithium metallic foil (100 μm, 2.2×3.2 cm$^2$) on a stainless steel net having a thickness of 80 μm was used and two plates were arranged at the upper and lower portions of an electrode multi-layer unit so as to face the negative electrode. The negative electrodes (one surface×2, both surfaces×8) were respectively made contact with the stainless steel net, on which lithium was contact-bonded, through welding. The opposed area (7.04 cm$^2$×2 (both surfaces×2)=14.08 cm$^2$) of lithium was 11.1% of the area of the negative electrode (7.04 cm$^2$×18 (both surfaces×8, one surface×2)=126.72 cm$^2$). The amount of lithium metal was about 250 mAh/g based on the negative electrode PAS. The total thickness of the electrode, separator and lithium metal was almost the same as in Example 1. Also, the electrolytic solution was the same as in Example 1. The total amount of lithium contained in the cell was 1500 mAh/g based on the negative plate PAS. One cell was allowed to stand at room temperature for two days, and then decomposed. As a result, lithium metal completely disappeared.

Each of the above cells was charged at 4.2V for 12hours at the maximum current of 150 mA. Subsequently, each of the above cells was discharged at a constant current of 70 mA until the cell voltage became 2.0 V. This 4.2 V-2.0 V cycle was repeated, and in the third discharge, the cell capacity was evaluated. As a result, it was 650 mAh. In the fourth cycle, discharge at constant current of 350 mA was conducted and the cell capacity was evaluated. As a result, it was 620 mAh.

EXAMPLE 4

The slurry obtained in Example 1 was molded on one surface of an aluminum expanded metal having a thickness of 120 μm (porosity: 85%) (manufactured by Sank Co., LW: 2 mm, SW: 1 mm) to obtain a positive electrode having a thickness of 400 μm.

Using the same positive electrode, PAS negative electrode and separator as in Example 1, two cells wherein the positive electrode, separator and negative electrode (four negative electrodes) are laminated shown in FIG. 4 were assembled. As two outer positive electrodes, a positive electrode having a thickness of 400 μm obtained by molding the slurry on one surface of the aluminum expanded metal having a thickness of 120 μm as described above was used. As the lithium metal, one obtained by contact-bonding a lithium metallic foil (280 μm, 2.0×3.0 cm$^2$) on a stainless steel net having a thickness of 80 μm was used and was arranged to face the positive electrode. The positive electrodes (one surface×2, both surfaces×3) were respectively made contact with the stainless steel net, on which lithium was contact-bonded, through welding. The opposed area (6 cm$^2$) of lithium was 12.5% of the area of the positive electrode (6 cm$^2$×8 (both surfaces×3, one surface×2)=48 cm$^2$). The amount of lithium metal was about 250 mAh/g based on the negative electrode PAS. The electrolytic solution was the same as in the above respective Examples. The total amount of lithium contained in the cell was 1500 mAh/g based on the negative plate PAS. Immediately after pouring the electrolytic solution, each of the cells was charged at a constant current of 150 mA for 4 hours. Then, one cell was allowed to stand at room temperature for two days and decomposed. As a result, lithium metal completely disappeared.

Each of the above cells was charged at 4.2V for 12 hours at the maximum current of 150 mA. Subsequently, each of the above cells was discharged at a constant current of 70 mA until the cell voltage became 2.0 V. This 4.2 V-2.0 V cycle was repeated, and in the third discharge, the cell capacity was evaluated. As a result, it was 720 mAh. In the fourth cycle, discharge at constant current of 350 mA was conducted and the cell capacity was evaluated. As a result, it was 300 mAh.

EXAMPLE 5

Using the same positive electrode, PAS negative electrode and separator as in Example 2, two cells wherein the positive electrode, separator and negative electrode (nine negative electrodes) are laminated shown in FIG. 4 were assembled. As two outer positive electrodes, a positive electrode having a thickness of 150 μm obtained by molding the slurry on one surface of the aluminum expanded metal having a thickness of 120 μm in the same manner as in Example 4 was used. As the lithium metal, one obtained by contact-bonding a lithium metallic foil (230 μm, 2.0×3.0 cm$^2$) on a stainless steel net having a thickness of 80 μm was used and arranged to face the positive electrode. The positive electrodes (one surface× 2, both surfaces×8) were respectively made contact with the stainless steel net, on which lithium was contact-bonded, through welding. The opposed area (6 cm$^2$) of lithium was 5.6% of the area of the positive electrode (6 cm$^2$×18 (both surfaces×8, one surface×2)=108 cm$^2$). The amount of lithium metal was about 250 mAh/g based on the negative electrode PAS. The total thickness of the electrode, separator and lithium metal was almost the same as in Example 4. Also, the electrolytic solution was the same as in the above respective Examples. The total amount of lithium contained in the cell was 1500 mAh/g based on the negative plate PAS. Immediately after pouring the electrolytic solution, each of the cells was charged at a constant current of 150 mA for 4 hours. Then, one cell was allowed to stand at room temperature for two days and decomposed. As a result, lithium metal completely disappeared.

Each of the above cells was discharged at a constant current of 70 mA until the cell voltage became 2.0 V, and charged at 4.2V for 12 hours at the maximum current of 150 mA. Subsequently, each of the above cells was discharged at a constant current of 70 mA until the cell voltage became 2.0 V. This 4.2 V-2.0 V cycle was repeated, and in the third discharge, the cell capacity was evaluated. As a result, it was 650 mAh. In the fourth cycle, discharge at constant current of 350 mA was conducted and the cell capacity was evaluated. As a result, it was 620 mAh.

EXAMPLE 6

Using the same positive electrode, PAS negative electrode and separator as in Example 2, two cells wherein the positive electrode, separator and negative electrode (nine negative electrodes) are laminated shown in FIG. 5 were assembled. Two outer positive electrodes were the same as in Example 5. As the lithium metal, one obtained by contact-bonding a lithium metallic foil (120 $\mu$m, 2.0×3.0 cm$^2$) on a stainless steel net having a thickness of 80 $\mu$m was used and arranged to face the positive electrode. The positive electrodes (one surface×2, both surfaces×8) were respectively made contact with the stainless steel net, on which lithium was contact-bonded, through welding. The opposed area (6 cm$^2$×2 (both surfaces×2)=12 cm$^2$) of lithium was 11.1% of the area of the positive electrode (6 cm$^2$×18 (both surfaces×8, one surface× 2)=108 cm$^2$). The amount of lithium metal was about 250 mAh/g based on the negative electrode PAS. The total thickness of the electrode, separator and lithium metal was almost the same as in Example 4. Also, the electrolytic solution was the same as in the above respective Examples. The total amount of lithium contained in the cell was 1500 mAh/g based on the negative electrode PAS. Immediately after pouring the electrolytic solution, each of the cells was charged at a constant current of 150 mA for 4 hours. Then, one cell was allowed to stand at room temperature for two days and decomposed. As a result, lithium metal completely disappeared.

Each of the above cells was discharged at a constant current of 70 mA until the cell voltage became 2.0 V, and charged at 4.2V for 12 hours at the maximum current of 150 mA. Subsequently, each of the above cells was discharged at a constant current of 70 mA until the cell voltage became 2.0 V. This 4.2 V-2.0 V cycle was repeated, and in the third discharge, the cell capacity was evaluated. As a result, it was 650 mAh. In the fourth cycle, discharge at constant current of 350 mA was conducted and the cell capacity was evaluated. As a result, it was 620 mAh.

Comparative Example 1

In the same manner as in Examples 1 and 4, except that an aluminum foil having a thickness of 30 $\mu$m was used as the current collector of the positive electrode and a copper foil having a thickness of 18 $\mu$m was used as the current collector of the negative electrode, two kinds of cells were assembled. Each of the cells was allowed to stand at room temperature for 20 days, and then decomposed. As a result, almost all of lithium metal was remained in both of the cells.

Comparative Example 2

In the same manner as in Examples 1 and 4, except that an aluminum foil having a thickness of 30 $\mu$m was used as the current collector of the positive electrode, two kinds of cells were assembled. Each of the cells was allowed to stand at room temperature for 20 days, and then decomposed. As a result, almost all of lithium metal was remained in both of the cells.

Comparative Example 3

In the same manner as in Examples 1 and 4, except that a copper foil having a thickness of 18 $\mu$m was used as the current collector of the negative electrode, two kinds of cells were assembled. Each of the cells was allowed to stand at room temperature for 20 days, and then decomposed. As a result, almost all of lithium metal was remained in both of the cells.

Comparative Example 4

In the same manner as in Example 1, a PAS negative electrode having a thickness of 290 $\mu$m and a positive electrode having a thickness of 438 $\mu$m were obtained. Using the positive electrode (2.0×3.0 cm$^2$), PAS negative electrode (2.2×3.2 cm$^2$) and polypropylene separator having a thickness of 25 $\mu$m, two cells wherein the positive electrode, separator and negative electrode (seven positive electrodes) are laminated were assembled. As two outer negative electrodes, one having a thickness of 175 nm obtained by peeling off one of the above negative electrodes molded on both surfaces was used. As the lithium metal, a lithium metallic foil (33 $\mu$m, 2.2×3.2 cm$^2$, 1.6×2.2 cm$^2$ for outer two foils) was attached to the negative electrode plate. The opposed area (7.04 cm$^2$×6+3.52 cm$^2$×2=49.28 cm$^2$) of lithium was 50.0% of the area of the negative electrode (7.04 cm$^2$×14 (both surfaces×6, one surface×2)=98.56 cm$^2$). The amount of lithium metal was about 250 mAh/g based on the negative electrode PAS. The total thickness of the electrode, separator and lithium metal was almost the same as in Example 1. Also, the electrolytic solution was the same as in Example 1. The total amount of lithium contained in the cell was 1500 mAh/g based on the negative plate PAS. One cell was allowed to stand at room temperature for two days, and then decomposed. As a result, lithium metal completely disappeared.

Each of the above cells was charged at 4.2V for 12 hours at the maximum current of 150 mA.Subsequently, each of the above cells was discharged at a constant current of 70 mA until the cell voltage became 2.0 V. This 4.2 V-2.0 V cycle was repeated, and in the third discharge, the cell capacity was evaluated. As a result, it was 680 mAh. In the fourth cycle, discharge at constant current of 350 mA was conducted and the cell capacity was evaluated. As a result, it was 400 mAh.

Comparative Example 5

In the same manner as in Example 1, a PAS negative electrode having a thickness of 250 $\mu$m and a positive electrode having a thickness of 380 $\mu$m were obtained. Using the positive electrode (2.0×3.0 cm$^2$), PAS negative electrode (2.2×3.2 cm$^2$) and a polypropylene separator having a thickness of 25 $\mu$m, two cells wherein the positive electrode, separator and negative electrode (seven negative electrodes) are laminated were assembled. As two outer positive electrodes, one having a thickness of 190 $\mu$m obtained by molding the slurry on one surface of an aluminum expanded metal having a thickness of 120 $\mu$m in the same manner as in Example 4 was used. As the lithium metal, a lithium metallic foil (33 $\mu$m, 2.0×3.0 cm$^2$, 1.5×2.0 cm$^2$ for outer two foils) was attached to the positive electrode plate. The opposed area (6 cm$^2$×6+3 cm$^2$×2=42 cm$^2$) of lithium was 50.0% of the area of the positive electrode (6 cm$^2$×14 (both surfaces×6, one surface×2)=84 cm$^2$). The amount of lithium metal was about 250 mAh/g based on the negative electrode PAS. The total thickness of the electrode, separator and lithium metal was almost the same as in the above respective Examples. Also, the electrolytic solution was the same as in Example 1. The total amount of lithium contained in the cell was 1500 mAh/g based on the negative plate PAS. Immediately after pouring the electrolytic solution, each of the cells was charged at a constant current of 150 mA for 4 hours. Then, one cell was allowed to stand at room temperature for two days and decomposed. As a result, lithium metal completely disappeared.

Each of the above cells was discharged at a constant current of 70 mA until the cell voltage became 2.0 V, and charged at 4.2V for 12 hours at the maximum current of 150 mA. Subsequently, each of the above cells was discharged at a constant current of 70 mA until the cell voltage became 2.0 V. This 4.2 V-2.0 V cycle was repeated, and in the third discharge, the cell capacity was evaluated. As a result, it was 550 mAh. In the fourth cycle, discharge at constant current of 350 mA was conducted and the cell capacity was evaluated. As a result, it was 320 mAh.

In Comparative Examples 4 and 5, although the thickness of lithium may be reduced to improve the charge and discharge characteristics, it is very complicated method, which is not suited for industrial production, to attach a lithium foil having a thickness of about 30 $\mu$m as a lower limit of the thickness for mass-production of lithium on each one negative electrode, actually. That is, in order to reduce the thickness of the electrode so as to improve the charge and discharge characteristics, a further thin lithium foil is required, whereby it becomes more difficult to conduct mass production and it becomes unsuitable for practical use.

As is apparent from the above respective Examples, the present invention can provide a method of carrying a lithium negative electrode or lithium positive electrode having a very large freedom considering the charge and discharge characteristics in a cell system having lithium originating in the negative electrode, namely cell system wherein lithium is previously carried on the negative electrode, or a cell system wherein lithium is previously carried on the positive electrode in addition to lithium contained intrinsically in the positive electrode.

EXAMPLE 7

In the same manner as in Example 1, a PAS negative electrode having a thickness of 180 $\mu$m and a positive electrode having a thickness of 290 $\mu$m were obtained. Using the positive electrode (5.4 cm in width×37.0 cm in length), PAS negative electrode (5.6 cm in width×39.0 cm in length) and polypropylene separator having a thickness of 25 $\mu$m, two cells were assembled. To contact-bond a lithium metallic foil, one surface of the negative electrode was provided with a current collector portion (4.8 cm) capable of forming no active material of negative electrode (total length of the negative electrode is 3.9 cm+4.8 cm). One obtained by contact-bonding the lithium metallic foil (160 $\mu$m, 5.6×4.8 cm$^2$) on the current collector of negative electrode was used and arranged to face the negative electrode and positive electrode, thereby to obtain a wound-type cylindrical cell (18650 type). The area (26.88 cm$^2$) of lithium was 6.2% of the area of the negative electrode (436.8 cm$^2$). The amount of lithium metal was about 250 mAh/g based on the negative electrode PAS. The electrolytic solution was the same as in the above respective Examples. The total amount of lithium contained in the cell was 1500 mAh/g based on the negative electrode PAS. One cell was allowed to stand at room temperature for two days, and then decomposed. As a result, Each of the above cells was charged at 4.2V for 12 hours at the maximum current of 500 mA.Subsequently, each of the above cells was discharged at a constant current of 200 mA until the cell voltage became 2.0 V. This 4.2 V-2.0 V cycle was repeated, and in the third discharge, the cell capacity was evaluated. As a result, it was 2000 mAh. In the fourth cycle, discharge at constant current of 1000 mA was conducted and the cell capacity was evaluated. As a result, it was 1900 mAh. The energy density was calculated. As a result, it was large such as 390 Wh/l.

EXAMPLE 8

Using the same positive electrode, PAS negative electrode and separator as in Example 7, two cylindrical cells were assembled. As the current collector of positive electrode, a stainless steel (SUS316) expanded metal having a thickness of 240 $\mu$m (porosity: 86%) (manufactured by Sank Co., LW: 2 mm, SW: 1 mm) was used. To contact-bond a lithium metallic foil, one surface of the positive electrode was provided with a current collector portion (5.2 cm) capable of forming no active material of positive electrode (total length of the positive electrode is 37.0 cm+5.2 cm). One obtained by contact-bonding the lithium metallic foil (150 $\mu$m, 5.4× 5.2 cm$^2$) on the current collector of positive electrode was used and arranged to face the negative electrode and positive electrode as shown in FIG. 8, thereby to obtain a wound-type cylindrical cell (18650 type). The area (28.08 cm$^2$) of lithium was 7.0% of the area of the positive electrode (399.6 cm$^2$). The amount of lithium metal was about 250 mAh/g based on the negative electrode PAS. The electrolytic solution was the same as in the above respective Examples. The total amount of lithium contained in the cell was 1500 mAh/g based on the negative electrode PAS. Immediately after pouring the electrolytic solution,each of the cells was charged at a constant current of 150 mA for 4 hours. One cell was allowed to stand at room temperature for two days, and then decomposed. As a result, lithium metal completely disappeared.

Each of the above cells was discharged at a constant current of 200 mA until the cell voltage became 2.0 V, and charged at a constant current of 500 mA until the cell voltage became 4.2 V, and then constant current/constant voltage charge of applying a constant voltage of 4.2 V was conducted for 12 hours. Subsequently, each of the above cells was discharged at a constant current of 200 mA until the cell voltage became 2.0 V. This 4.2 V-2.0 V cycle was repeated, and in the third discharge, the cell capacity was evaluated. As a result, it was 1980 mAh. In the fourth cycle, discharge at constant current of 1000 mA was conducted and the cell capacity was evaluated. As a result, it was 1850 mAh. The energy density was calculated. As a result, it was large such as 385 Wh/l.

Comparative Example 6

In the same manner as in Example 7, a PAS negative electrode having a thickness of 180 $\mu$m and a positive electrode having a thickness of 290 $\mu$m were obtained. Using the positive electrode (5.4 cm in width×37.5 cm in length), PAS negative electrode (5.6 cm in width×39.5 cm in length) and polypropylene separator having a thickness of 25 $\mu$m, two cylindrical cells were assembled. Lithium was not arranged in the cell. The electrolytic solution was the same as in the above respective Examples. The total amount of lithium contained in the cell was 1250 mAh/g based on the negative plate PAS.

Each of the above cells was charged at 4.2V for 12 hours at the maximum current of 500 mA.Subsequently, each of the above cells was discharged at a constant current of 200 mA until the cell voltage became 2.0 V. This 4.2 V-2.0 V cycle was repeated, and in the third discharge, the cell capacity was evaluated. As a result, it was 1500 mAh. In the fourth cycle, discharge at constant current of 1000 mA was conducted and the cell capacity was evaluated. As a result, it was 1450 mAh. The energy density was calculated. As a result, it was large such as 290 Wh/l.

As described above, when the amount of lithium originating in the negative electrode is 0 mAh/g or when lithium is not electrochemically carried in addition to lithium contained intrinsically in the positive electrode, a sufficient capacity could not be obtained.

EXAMPLE 9

In the same manner as in Example 1, a PAS negative electrode having a thickness of 200 μm was obtained. Then, 100 parts by weight of $V_2O_5$ (second type of the positive electrode) and 10 parts by weight of acetylene black were sufficiently mixed with a solution of 3.5 parts by weight of polyvinylidene fluoride powder in 80 parts by weight of N-methyl pyrrolidone to obtain a slurry. The slurry was molded on both surfaces of an aluminum expanded metal having a thickness of 240 μm (porosity: 88%) (manufactured by Sank Co., LW: 2 mm, SW: 1 mm) to obtain a positive electrode having a thickness of 750 μm. In addition, a slurry was molded on one surface of an aluminum expanded metal having a thickness of 120 μm (porosity: 85%) (manufactured by Sank Co., LW: 2mm, SW: 1 mm) to obtain a positive electrode having a thickness of 300 μm.

Using the above positive electrode (2.0×3.0 cm$^2$), PAS negative electrode (2.2×3.2 cm$^2$) and a separator having a thickness of 25 μm, two cells wherein the positive electrode, separator and negative electrode (nine negative electrodes) are laminated shown in FIG. 4 were assembled. As two outer negative electrodes, one having a thickness of 300 μm obtained by molding the slurry on one surface of the aluminum expanded metal having a thickness of 120 μm as described above was used. As the lithium metal, one obtained by contact-bonding a lithium metallic foil (850 μm, 2.0×3.0 cm$^2$) on a stainless steel net having a thickness of 80 μm was used and was arranged to face the positive electrode. The positive electrodes (one surface×2, both surfaces×8) were respectively made contact with the stainless steel net, on which lithium was contact-bonded, through welding. The opposed area (6 cm$^2$) of lithium was 5.6% of the area of the negative electrode (6 cm$^2$×18 (both surfaces×8, one surface×2)=108 cm$^2$). The amount of lithium metal was about 1000 mAh/g based on the negative electrode PAS. The electrolytic solution was the same as in Example 1. The total amount of lithium contained in the cell was 1500 mAh/g based on the negative plate PAS. One cell was allowed to stand at room temperature for seven days, and then decomposed. As a result, lithium metal completely disappeared. Each of the above cells was charged at 3.3 V for 12 hours at the maximum current of 150 mA. Subsequently, each of the above cells was discharged at a constant current of 70 mA until the cell voltage became 1.0 V. This 3.3 V-1.0 V cycle was repeated, and in the third discharge, the cell capacity was evaluated. As a result, it was 600 mAh.

INDUSTRIAL APPLICABILITY

As described above, the organic electrolytic cell according to the present invention is extremely useful because of its easy production, high capacity and high voltage, excellent charge and discharge characteristics, and high safety.

What is claimed is:

1. An organic electrolytic cell comprising a positive electrode, a negative electrode and a solution of lithium salt in an aprotic organic solvent as an electrolytic solution, wherein a current collector of the positive electrode and a current collector of the negative electrode are respectively provided with pores piercing from a front surface to a back surface, an active material of the negative electrode is capable of reversibly carrying lithium ions, and lithium originating in the negative electrode is carried through said pores by electrochemical contact with a lithium metal layer, and wherein the lithium metal layer is arranged to face the negative or positive electrode, and an opposed area of the lithium metal layer is not more than 40% of a total area of the negative electrode.

2. The organic electrolytic cell according to claim 1, wherein the active material of the negative electrode is an infusible and insoluble polyacene substrate having a hydrogen/carbon atomic ratio of 0.50 to 0.05, the substrate being a heat-treated product of an aromatic condensation polymer.

3. An organic electrolytic cell wherein the total amount of lithium contained the cell is not less than 500 mAh/g and the amount of lithium originating in the negative electrode is not less than 100 mAh/g, based on the active material of the negative electrode of claim 2.

4. An organic electrolytic cell comprising a positive electrode, a negative electrode and a solution of lithium salt in an aprotic organic solvent as an electrolytic solution, wherein a current collector of the positive electrode and a current collector of the negative electrode are respectively provided with pores piercing from a front surface to a back surface, an active material of the positive electrode and an active material of the negative electrode are capable of reversibly carrying lithium ions, and at least one portion of lithium originating in the positive electrode is carried through said pores by electrochemical contact with a lithium metal layer, and wherein the lithium metal layer is arranged to face the negative or positive electrode, and an opposed area of the lithium metal layer is not more than 40% of a total area of the positive electrode.

5. The organic electrolytic cell according to claim 4, wherein the active material of the negative electrode is an infusible and insoluble polyacene substrate having a hydrogen/carbon atomic ratio of 0.50 to 0.05, the substrate being a heat-treated product of an aromatic condensation polymer.

* * * * *